United States Patent
Tseng et al.

(10) Patent No.: US 12,306,486 B2
(45) Date of Patent: May 20, 2025

(54) ELECTRONIC DEVICE

(71) Applicant: Innolux Corporation, Miaoli County (TW)

(72) Inventors: Yu-Chih Tseng, Miaoli County (TW); Pi-Ying Chuang, Miaoli County (TW); Yi Tung, Miaoli County (TW); Chu-Hong Lai, Miaoli County (TW); Kuo-Shun Tsai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/335,081

(22) Filed: Jun. 14, 2023

(65) Prior Publication Data

US 2024/0027801 A1    Jan. 25, 2024

(30) Foreign Application Priority Data

Jul. 21, 2022    (CN) .......................... 202210859534.4

(51) Int. Cl.
  *G02F 1/13*    (2006.01)
  *G02F 1/1339*   (2006.01)
  *G02F 1/1347*   (2006.01)

(52) U.S. Cl.
  CPC .......... *G02F 1/1323* (2013.01); *G02F 1/1339* (2013.01); *G02F 1/13471* (2013.01); *G02F 2202/28* (2013.01)

(58) Field of Classification Search
  CPC ..................................................... G02F 1/1323
  See application file for complete search history.

(56) References Cited

U.S. PATENT DOCUMENTS

| | | | |
|---|---|---|---|
| 8,704,986 | B2 | 4/2014 | Jin et al. |
| 2009/0290117 | A1 | 11/2009 | Watanabe et al. |
| 2012/0300042 | A1* | 11/2012 | Yun ........ H04N 13/305 349/200 |
| 2016/0011445 | A1* | 1/2016 | Chen ........ G02F 1/1337 349/110 |
| 2018/0004334 | A1* | 1/2018 | Park ........ G06F 3/04164 |
| 2018/0210243 | A1 | 7/2018 | Fang et al. |
| 2019/0310302 | A1* | 10/2019 | Lee ........ G06F 3/04164 |
| 2023/0217782 | A1* | 7/2023 | Rhim ........ H10K 59/50 257/40 |

FOREIGN PATENT DOCUMENTS

| | | |
|---|---|---|
| CN | 106501982 | 3/2017 |
| CN | 110501824 | 11/2019 |
| CN | 112305788 | 2/2021 |
| TW | 200600930 | 1/2006 |
| TW | I269914 | 1/2007 |

OTHER PUBLICATIONS

"Office Action of Taiwan Counterpart Application", issued on Mar. 27, 2025, p. 1-p. 8.

* cited by examiner

*Primary Examiner* — Edmond C Lau
(74) *Attorney, Agent, or Firm* — JCIPRNET (57) ABSTRACT

An electronic device, including a light emitting unit, a first viewing angle control unit, and a circuit control unit, is provided. The light emitting unit has a first side and a second side opposite to the first side. The first viewing angle control unit is disposed at the first side. The circuit control unit is disposed at the second side. The light emitting unit and the first viewing angle control unit are electrically connected to the circuit control unit. A portion of the first viewing angle control unit is bendable towards the second side.

6 Claims, 9 Drawing Sheets

ELECTRONIC DEVICE

CROSS-REFERENCE TO RELATED APPLICATION

This application claims the priority benefit of China application serial no. 202210859534.4, filed on Jul. 21, 2022. The entirety of the above-mentioned patent application is hereby incorporated by reference herein and made a part of this specification.

BACKGROUND

Technical Field

The disclosure relates to an electronic device, and particularly to an electronic device including a viewing angle control unit.

Description of Related Art

Electronic devices are widely used. In order to ensure the privacy of users, many electronic devices are matched with corresponding structures and designs for privacy protection functions. For example, the electronic device is matched with a switchable viewing angle control element to implement the privacy protection function and maintain the original display effect of the electronic device. With the development of the electronic devices, the privacy protection functions still need to be continuously improved.

SUMMARY

According to an embodiment of the disclosure, an electronic device includes a light emitting unit, a first viewing angle control unit, and a circuit control unit. The light emitting unit has a first side and a second side opposite to the first side. The first viewing angle control unit is disposed at the first side. The circuit control unit is disposed at the second side, and the light emitting unit and the first viewing angle control unit are electrically connected to the circuit control unit. A portion of the first viewing angle control unit is bendable towards the second side.

According to an embodiment of the disclosure, an electronic device includes a light emitting unit, a viewing angle control structure, and a circuit control unit. The light emitting unit has a first side and a second side opposite to the first side. The viewing angle control structure is disposed at the first side. The circuit control unit is disposed at the second side, and the light emitting unit and the first viewing angle control unit are electrically connected to the circuit control unit. The viewing angle control structure includes a first portion and an integrated second portion protruding from the first portion, and the second portion may be bent and bonded to the circuit control unit.

DETAILED DESCRIPTION OF DISCLOSED EMBODIMENTS

The disclosure can be understood by referring to the following detailed description in conjunction with the drawings. It should be noted that in order to facilitate the understanding of the reader and the simplicity of the drawings, some drawings in the disclosure only depict a portion of an electronic device, and specific elements in the drawings are not drawn according to actual scale. In addition, the number and the size of each element in the drawings are for illustration only and are not intended to limit the scope of the disclosure.

Throughout the specification and the appended claims of the disclosure, certain terms are used to refer to specific elements. It should be understood by persons skilled in the art that electronic device manufacturers may refer to the same element by different names. The disclosure does not intend to distinguish between elements with the same function but different names. In the following specification and claims, words such as "including", "containing", and "having" are open-ended words, so the words should be interpreted as "comprising but not limited to . . . ". Therefore, when the terms "including", "containing", and/or "having" are used in the description of the disclosure, the words designate the presence of corresponding features, regions, steps, operations, and/or components, but do not exclude the presence of one or more corresponding features, regions, steps, operations, and/or components.

Directional terms, such as "upper", "lower", "front", "rear", "left", and "right", mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or the nature covered by the embodiments. For example, the relative sizes, thicknesses, and positions of various film layers, regions, and/or structures may be reduced or enlarged for clarity.

When a corresponding component (for example, a film layer or a region) is referred to as being "disposed or formed on another component", the component may be directly disposed or formed on the other component, or there may be another component between the two. On the other hand, when a component is referred to as being "directly disposed or formed on" another component, there is no component between the two. In addition, when a component is referred to as being "disposed or formed on another component", the two have an up-down relationship in the top view direction. The component may be above or below the other component, and the up-down relationship depends on the orientation of the device.

It should be understood that when a component or a film layer is referred to as being "connected to" another component or film layer, the component may be directly connected to the other component or film layer, or there may be a component or a film layer inserted between the two. When a component is referred to as being "directly connected" to another component or film layer, there is no component or film layer inserted between the two. Also, when a component is referred to as being "coupled to another component (or a variation thereof)", the component may be directly connected to the other component and indirectly (for example, electrically) connected to the other component through one or more components.

The terms "about", "equal to", "equivalent", "same", "substantially", or "roughly" are generally construed as within 20% of a given value or range, or as within 10%, 5%, 3%, 2%, 1%, or 0.5% of the given value or range.

Terms such as "first" and "second" used in the specification and the claims are used to modify elements, and the terms do not imply and represent that the elements have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terms, whereby a first component in the specification may be a second component in the claims.

Electrical connection or coupling described in the disclosure may refer to direct connection or indirect connection. In the case of direct connection, terminals of elements on two circuits are directly connected or connected to each other by a conductor segment. In the case of indirect connection, there is a switch, a diode, a capacitor, an inductor, a resistor, other suitable elements, or a combination of the above elements between the terminals of the elements on the two circuits, but not limited thereto.

In the disclosure, the measurement manner of thickness, length, and width may adopt an optical microscope, and the thickness may be measured by a cross-sectional image in an electron microscope, but not limited thereto. In addition, there may be a certain error between any two values or directions for comparison. If a first value is equal to a second value, it implies that there may be an error of about 10% between the first value and the second value; if a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

In the disclosure, the electronic device may include a display device, a high-frequency device, a sensing device, or a splicing device, but not limited thereto. The electronic device may be a bendable or flexible electronic device. The electronic device may include, for example, liquid crystal or a light emitting diode. The light emitting diode may include, for example, an organic light emitting diode (OLED), a mini LED, a micro LED, a quantum dot (QD) LED (for example, QLED, QDLED), fluorescence, phosphor, or other suitable materials, and the materials may be arbitrarily arranged and combined, but not limited thereto. The high-frequency device may be, for example, an antenna or a liquid crystal antenna, but not limited thereto. The splicing device may be, for example, a display splicing device or a high-frequency splicing device, but not limited thereto. It should be noted that the electronic device may be any arrangement and combination of the above, but not limited thereto. The display device may be a non-self-luminous display device or a self-luminous display device. The sensing device may be a sensing device for sensing capacitance, light rays, heat energy, or ultrasonic waves, but not limited thereto. In the disclosure, an electronic member may include a passive element and an active element, such as a chip, a capacitor, a resistor, an inductor, a diode, and a transistor. The diode may include a light emitting diode or a photodiode. The light emitting diode may include, for example, an organic light emitting diode (OLED), a mini LED, a micro LED, or a quantum dot LED, but not limited thereto. Hereinafter, the disclosure will be described with the display device, but the disclosure is not limited thereto.

In the following drawings, the X-axis, the Y-axis, and the Z-axis are used as references for relative directions. In some embodiments, the X-axis, the Y-axis, and the Z-axis may intersect in pairs. In some embodiments, the X-axis, the Y-axis, and the Z-axis may be substantially perpendicular, completely perpendicular, or not completely perpendicular to each other. The Z-axis direction may be understood as the normal direction of the electronic device, but not limited thereto.

Figure 1:
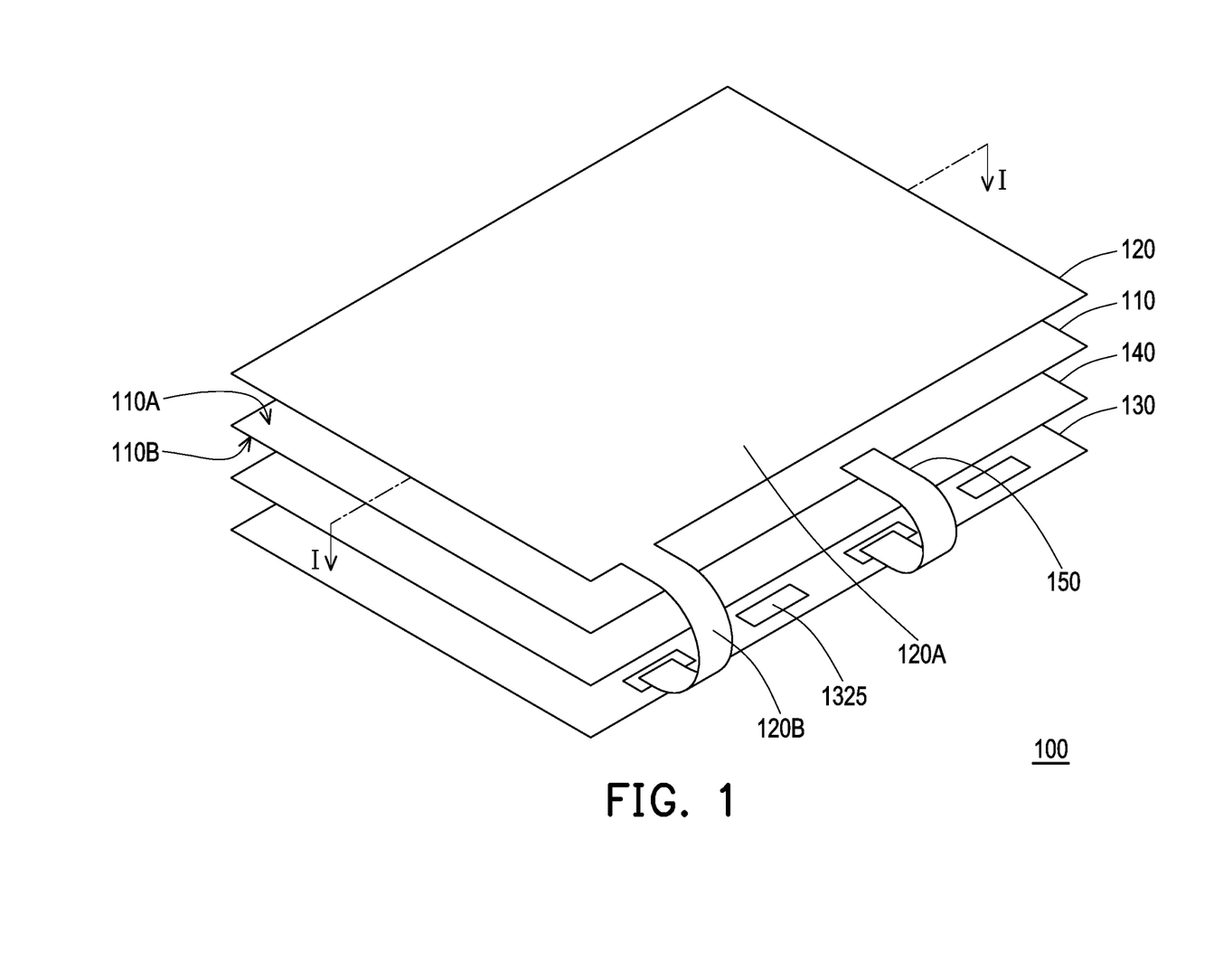
FIG. 1 is a schematic view of an electronic device according to an embodiment of the disclosure.

FIG. 1 is a schematic view of an electronic device according to an embodiment of the disclosure. In order to express the relative arrangement relationship of individual elements, the individual elements are only schematically represented by single inclined rectangles in FIG. 1, but the individual elements are actually three-dimensional objects with thicknesses. An electronic device 100 of FIG. 1 includes a light emitting unit 110, a first viewing angle control unit 120, a circuit control unit 130, and a supporting member 140. The light emitting unit 110 has a first side 110A and a second side 110B opposite to the first side 110A. In some embodiments, the first side 110A and the second side 110B are opposite each other on the Z-axis. The first viewing angle control unit 120 is disposed at the first side 110A, and the circuit control unit 130 is disposed at the second side 110B. Therefore, the first viewing angle control unit 120 and the circuit control unit 130 are respectively located at two opposite sides (that is, the first side 110A and the second side 110B) of the light emitting unit 110. In addition, the supporting member 140 is disposed between the light emitting unit 110 and the circuit control unit 130. In this way, the circuit control unit 130, the supporting member 140, the light emitting unit 110, and the first viewing angle control unit 120 are sequentially stacked, for example, along the Z-axis. In other words, the stacking direction of the circuit control unit 130, the supporting member 140, the light emitting unit 110, and the first viewing angle control unit 120 may be understood as the Z-axis direction. However, the disclosure is not limited thereto.

The light emitting unit 110 may provide light rays. In some embodiments, the light emitting unit 110 is an element that provides display light rays for presenting an image, which may be implemented by, for example, using a display panel, but not limited thereto. The display panel may include a self-luminous or non-self-luminous panel. The self-luminous panel includes, for example, an organic light emitting diode (OLED), a mini LED, a micro LED, or a quantum dot LED (QD LED), but not limited thereto. The non-self-luminous panel includes, for example, liquid crystal or other suitable materials. In addition, the light emitting unit 110 may be formed by a non-self-luminous display panel matched with a corresponding light source (for example, a backlight source, a front light source, a double-side light source, etc.).

The first viewing angle control unit 120 is located at the first side 110A of the light emitting unit 110. The first viewing angle control unit 120 is located between the user and the light emitting unit 110. For example, the first viewing angle control unit 120 is disposed on the path of the display light rays of the light emitting unit 110 for displaying an image. The first viewing angle control unit 120 has a viewing angle control function. For example, the first viewing angle control unit 120 may adjust the collimation of the display light rays of the light emitting unit 110 for displaying the image, so as to determine a viewing angle range in which the user can clearly view the displayed image. In this way, the first viewing angle control unit 120 can achieve a privacy protection function. The first viewing angle control unit 120 may change and/or adjust the collimation of the display light rays of the light emitting unit 110 by control switching. In other words, a control operation of the first viewing angle control unit 120 may be switched between a wide viewing angle display effect and a narrow viewing angle display effect.

In the embodiment, at least one portion of the first viewing angle control unit 120 is bendable towards the second side 110B. For example, the first viewing angle control unit 120 may include a first portion 120A and a second portion 120B. The first portion 120A is, for example, a viewing angle control portion, which may provide the viewing angle control function, and the second portion 120B is, for example, an extension portion. For example, the second portion 120B is a region extending outward from the first portion 120A. The outward extension in the disclosure means that the extension directions of the long axes of the two elements are different. The second portion 120B may be bent and disposed at the second side 110B of the light emitting unit 110. Specifically, in a usage state, the light emitting unit 110 may be disposed between the first portion 120A and the second portion 120B. Therefore, the first viewing angle control unit 120 has flexibility. Alternatively, the first viewing angle control unit 120 has flexibility at least at the second portion 120B. The second portion 120B may function as a flexible circuit board and may include a conductive component for transmitting signals, such as a metal signal line, an electrode, a and conductive adhesive. In some embodiments, the second portion 120B may be used as a chip on film (COF) by bonding with a control circuit, such as an integrated circuit (IC) chip.

The circuit control unit 130 is, for example, a circuit board, such as a printed circuit board (PCB) and a flexible circuit board (FPC), and the circuit control unit 130 may further include a circuit element 132, such as an active element (for example, an IC), a memory, and a passive element, bonded to the circuit board to provide functions such as transmitting command signals and collecting signals. The second portion 120 of the first viewing angle control unit 120 may extend to the second side 110B of the light emitting unit 110 and be bonded to the circuit control unit 130. Therefore, the first viewing angle control unit 120 may be electrically connected to the circuit control unit 130 through its own second portion 120. In addition, the light emitting unit 110 may also be electrically connected to the circuit control unit 130. In some embodiments, the light emitting unit 110 may be electrically connected to the circuit control unit 130 through an additionally provided connecting member 150, wherein the connecting member 150 is, for example, a flexible circuit board or a similar element. In some embodiments, the light emitting unit 110 may include its own extension portion and is electrically connected to the circuit control unit 130 through the extension portion, wherein the extension portion of the light emitting unit 110 may also function as a flexible circuit board and may include a conductive component for transmitting signals.

The supporting member 140 is disposed between the light emitting unit 110 and the circuit control unit 130 to support the light emitting unit 110 and the first viewing angle control unit 120 thereon. The supporting member 140 may be plate-shaped and includes, for example, an element with supporting ability, such as a polyethylene terephthalate film, an iron sheet, and a steel sheet. According to some embodiments, the supporter 140 may have a mesh structure, but not limited thereto.

Figure 2:
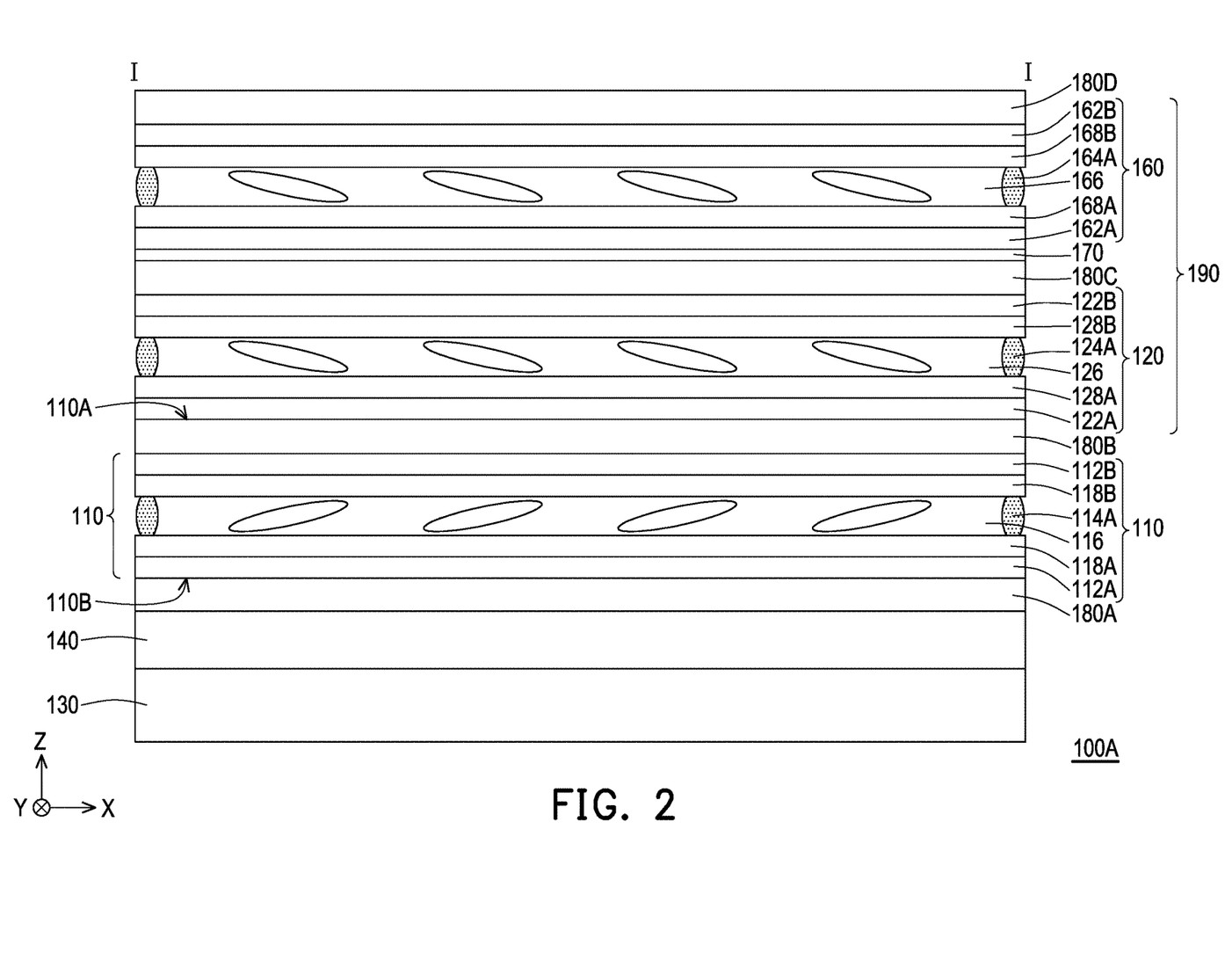
FIG. 2 is a schematic cross-sectional view of an electronic device according to an embodiment of the disclosure.

FIG. 2 is a schematic cross-sectional view of an electronic device according to an embodiment of the disclosure. The cross-section of FIG. 2 corresponds to a line I-I in FIG. 1, but the device shown in FIG. 2 is only an exemplary illustration and is not intended to limit the cross-sectional structure of the electronic device of FIG. 1. In FIG. 2, an electronic device 100A may be an implementation of the electronic device of FIG. 1, but not limited thereto. For example, in addition to all the elements (the light emitting unit 110, the first viewing angle control unit 120, the circuit control unit 130, and the supporting member 140) of the electronic device 100 in FIG. 1, the electronic device 100A of FIG. 2 further includes a second viewing angle control unit 160, a first adhesive layer 170, and multiple polarizing units, such as a first polarizing unit 180A, a second polarizing unit 180B, a third polarizing unit 180C, and a fourth polarizing unit 180D. In the embodiment, the circuit control unit 130, the supporting member 140, the first polarizing unit 180A, the light emitting unit 110, the second polarizing unit 180B, the first viewing angle control unit 120, the third polarizing unit 180C, the first adhesive layer 170, the second viewing angle control unit 160, and the fourth polarizing unit 180D are sequentially stacked along the Z-axis to form the electronic device 100A. In other words, the second viewing angle control unit 160 is disposed on the first viewing angle control unit 120. In order to simplify the drawing, the circuit control unit 130 and the supporting member 140 are only represented by rectangles in FIG. 2, and individual structures and details of the circuit control unit 130 and the supporting member 140 are not specifically shown.

The light emitting unit 110 is exemplified by a display panel, but not limited thereto. The light emitting unit 110 may include a first substrate 112A, a second substrate 112B, a sealing member 114, a display medium 116, a first functional layer 118A, and a second functional layer 118B. The first substrate 112A and the second substrate 112B may be light transmitting substrates. In the Z-axis direction, the second substrate 112B is disposed on the first substrate 112A, and the sealing member 114 is disposed between the first substrate 112A and the second substrate 112B. The display medium 116 is disposed between the first substrate 112A and the second substrate 112B, and is surrounded by the sealing member 114. The first functional layer 118A is disposed between the first substrate 112A and the display medium 116, and the second functional layer 118B is disposed between the second substrate 112B and the display medium 116. The first functional layer 118 and the second functional layer 118B may include driving elements, thin film transistors, metal electrodes, transparent electrodes, or similar components for providing electric fields and/or currents that can drive the display medium 116. In some embodiments, the second functional layer 118B may further selectively include a color filter layer, etc. to provide a color filter effect, so that the electronic device 100A can display a colorful image. In some embodiments, the display medium 116 may include a liquid crystal material or a diode, but not limited thereto. In some embodiments, a light source module may be disposed between the light emitting unit 110 and the circuit control unit 130 to provide a display light source.

The first polarizing unit 180A and the second polarizing unit 180B are disposed at two opposite sides of the light emitting unit 110. That is, the light emitting unit 110 is disposed between the first polarizing unit 180A and the second polarizing unit 180B. The first polarizing unit 180A and the second polarizing unit 180B can provide polarizing characteristics in different polarizing directions. In some embodiments, the polarizing directions provided by the first polarizing unit 180A and the second polarizing unit 180B are perpendicular to each other on the plane of the X-axis and the Y-axis, but not limited thereto. The first polarizing unit 180A and the second polarizing unit 180B may be respectively pre-manufactured polarizing films and disposed on one side of the first substrate 112A and the second substrate 112B of the light emitting unit 110 through means of attachment. In some embodiments, the first polarizing unit 180A and the second polarizing unit 180B may respectively include coating polarizing layers coated on the first substrate 112A and the second substrate 112B of the light emitting unit 110.

The first viewing angle control unit 120 may include a first substrate 122A, a second substrate 122B, a sealing member 124A, a switchable medium 126, a first electrode 128A, and a second electrode 128B. The first substrate 122A and the second substrate 122B may be light transmitting substrates. In the Z-axis direction, the second substrate 122B is disposed on the first substrate 122A, and the sealing member 124A is disposed between the first substrate 122A and the second substrate 122B. The first substrate 122A and the second substrate 122B may be flexible substrates, and the materials thereof are, for example, organic materials, such as polyimide (PI), epoxy, or other suitable materials, but not limited thereto. The switchable medium 126 is disposed between the first substrate 122A and the second substrate 122B, and is surrounded by the sealing member 124A. The first electrode 128A is disposed on one side of the first substrate 122A and is located between the first substrate 122A and the switchable medium 126, and the second electrode 128B is disposed on one side of the second substrate 122B and is located between the second substrate 122B and the switchable medium 126.

The switchable medium 126 may include liquid crystal or other suitable materials, but not limited thereto. In some embodiments, the switchable medium 126 and the display medium 116 may use different types of liquid crystal materials or the same type of liquid crystal materials. The first substrate 122A and the second substrate 122B may adopt flexible substrates and have thin thicknesses. For example, the first substrate 122A and the second substrate 122B may be greater than or equal to 25 micrometers (μm) and less than or equal to 100 μm, thus helping to reduce the overall thickness of the electronic device 100A, but not limited thereto. Although the first portion 120A of the first viewing angle control unit 120 in the cross-sectional structure of FIG. 1 is not shown in FIG. 2, a portion of at least one of the first substrate 122A and the second substrate 122B may extend outward to form the second portion 120B in FIG. 1. In other words, the second portion 120B of FIG. 1 includes at least one of the flexible first substrate 122A and the second substrate 122B. In addition, in FIG. 2, the first electrode 128A and the second electrode 128B may include transparent conductive materials and have conductive and light transmitting properties. In some embodiments, the first electrode 128A and the second electrode 128B may include indium tin oxide, indium zinc oxide, etc.

The first viewing angle control unit 120 is disposed between the second polarizing unit 180B and the third polarizing unit 180C. In some embodiments, the first viewing angle control unit 120 may be attached to the second polarizing unit 180B through an adhesive layer (not shown in FIG. 2), but not limited thereto. In some embodiments, the third polarizing unit 180C may include a coating polarizing layer. In other words, the third polarizing unit 180C is a coating layer coated on the second substrate 122B of the first viewing angle control unit 120. Although FIG. 2 shows that the third polarizing unit 180C is located outside the second substrate 122B, in some embodiments, the third polarizing unit 180C may be located inside the second substrate 122B, that is, between the second substrate 122B and the second electrode 128B.

The first viewing angle control structure 120 may control the collimation of light to achieve a viewing angle switching effect, so that the user can feel effects of a privacy protection display mode and a general display mode. For example, the switchable medium 126 has, for example, optical anisotropy. The first electrode 128A and the second electrode 128B may control the state, such as the arrangement direction and the inclination direction, of the switchable medium 126, so that the switchable medium 126 can provide a switchable optical effect. In the privacy protection display mode, the switchable medium 126 is driven by the first electrode 128A and the second electrode 128B, so that light from the second polarizing unit 180B passes through the third polarizing unit 180C only in a narrow viewing angle range. In the general display mode (or a wide viewing angle display mode), the switchable medium 126 is driven by the first electrode 128A and the second electrode 128B, so that the light from the second polarizing unit 180B passes through the third polarizing unit 180C in a wide viewing angle range. Therefore, the electronic device 100A may have the privacy protection display mode and the general display mode (or the wide viewing angle display mode), and the user can switch between different display modes according to requirements.

Please continue to refer to FIG. 2. The electronic device 100 may further include the second viewing angle control unit 160. The second viewing angle control unit 160 is disposed on the first viewing angle control unit 120, the second viewing angle control unit 160 is electrically connected to the circuit control unit 130, and the second viewing angle control unit 160 has a structural design similar to the first viewing angle control unit 120. For example, the second viewing angle control unit 160 may include a first substrate 162A, a second substrate 162B, a sealing member 164A, a switchable medium 166, a first electrode 168A, and a second electrode 168B, and the components respectively correspond to the first substrate 122A, the second substrate 122B, the sealing member 124A, the switchable medium 126, the first electrode 128A, and the second electrode 128B of the first viewing angle control unit 120. The reference in the disclosure corresponds to that the elements may be matched with each other, so that the electronic device is operable or that the elements at least partially overlap in the Z-axis direction. For example, in the Z-axis direction, the second viewing angle control unit 160 and the first viewing angle control unit 120 at least partially overlap, so that the light from the light emitting unit 110 may be switched or adjusted according to the requirements of the user.

The second viewing angle control unit 160 is disposed between the third polarizing unit 180C and the fourth polarizing unit 180D. In some embodiments, the fourth polarizing unit 180D may be a pre-manufactured polarizing sheet and is attached to the second substrate 162B of the second viewing angle control unit 160, or the fourth polarizing unit 180D may be a coating polarizing layer coated on the second substrate 162B. In some embodiments, when the fourth polarizing unit 180D is a coating polarizing layer, the fourth polarizing unit 180D may be located between the second substrate 162B and the second electrode 168B. In addition, in some embodiments, an additional polarizing unit, such as an additional coating polarizing layer, may be disposed on one side of the first substrate 162A of the second viewing angle control unit 160.

Continuing to refer to FIG. 2, the first adhesive layer 170 may be disposed between the second viewing angle control unit 160 and the first viewing angle control unit 120. The first adhesive layer 170 between the second viewing angle control unit 160 and the first viewing angle control unit 120 is used to attach the two together. The first adhesive layer 170 may include optical adhesive or other suitable transparent materials, but not limited thereto. The first viewing angle control unit 120 and the second viewing angle control unit 160 are attached to each other to jointly form a viewing angle control structure 190 for adjusting the display effect of the electronic device 100A. Specifically, the viewing angle control structure may include the first viewing angle control unit 120, the second viewing angle control unit 160, the first adhesive layer 170, the second polarizing unit 180B, the third polarizing unit 180C, and the fourth polarizing unit 180D. The switchable medium 126 in the first viewing angle control unit 120 may control the collimation of the light from the second polarizing unit 180B passing through the third polarizing unit 180C under the driving of signals provided by the first electrode 128A and the second electrode 128B, and the switchable medium 166 in the second viewing angle control unit 160 may control the collimation of light from the third polarizing unit 180C passing through the fourth polarizing unit 180D under the driving of signals provided by the first electrode 168A and the second electrode 168B. Therefore, the electronic device 100A may implement at least two display modes of a narrow viewing angle display mode and the general display mode (or the wide viewing angle display mode) by switching the viewing angle control unit of at least one of the first viewing angle control unit 120 and the second viewing angle control unit 160, but not limited thereto. When the first viewing angle control unit 120 and the second viewing angle control unit 160 are both switched to the narrow viewing angle display mode at the same time, the viewable viewing angle range of the electronic device 100A may be more effectively reduced to achieve a good privacy protection effect.

In some embodiments, the first viewing angle control unit 120 and the second viewing angle control unit 160 both adopt flexible substrates as supporting substrates of the switchable media 126 and 166 thereof, and the flexible substrates have thin and flexible properties. At the same time, at least one of the third polarizing unit 180C and the fourth polarizing unit 180D may be disposed on the first viewing angle control unit 120 and the second viewing angle control unit 160 by means of coating, and the thickness thereof is only the coating thickness, which may be, for example, greater than or equal to 0.1 μm and less than or equal to 10 μm. The thickness is much thinner than the pre-manufactured polarizing sheet. Therefore, although the viewing angle control structure 190 adopts the double-layer viewing angle control units, the overall thickness of the electronic device 100A is not significantly increased, which may also ensure that the electronic device 100A can achieve a thinning effect. Overall, the electronic device 100A can not only have a good narrow viewing angle display effect under the double-layer viewing angle control units, but also have a thin and light volume and good display brightness.

Figure 3:
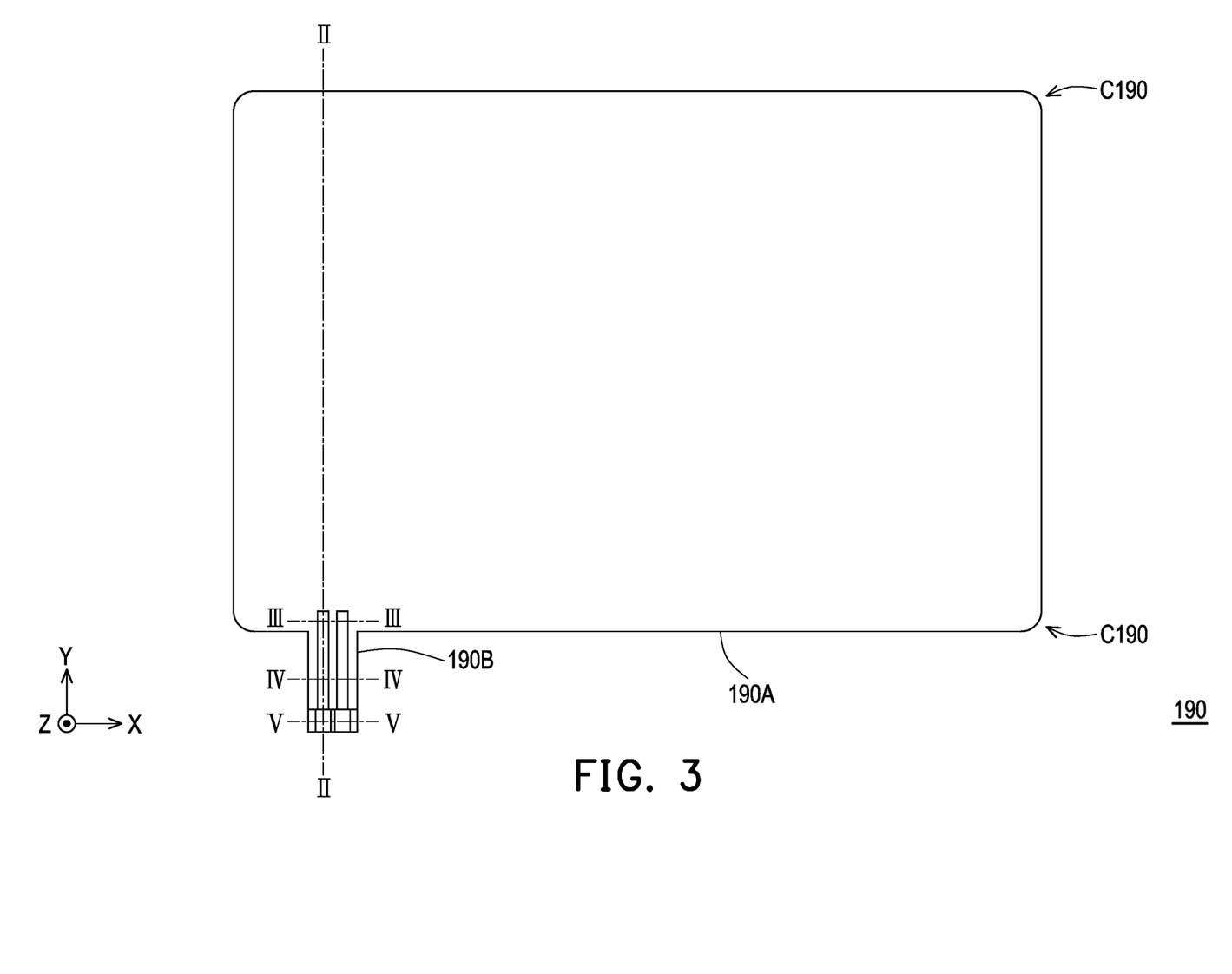
FIG. 3 is a schematic top view of a viewing angle control structure according to an embodiment of the disclosure.

FIG. 3 is a schematic top view of a viewing angle control structure according to an embodiment of the disclosure. The viewing angle control structure 190 of FIG. 3 may be one of the implementations of the top view structure of the viewing angle control structure 190 in the electronic device 100A of FIG. 2 or may be one of the implementations of the top view structure of the first viewing angle control unit 120 or the second viewing angle control unit 160 in the electronic device 100 of FIG. 1, but not limited thereto. In FIG. 3, the contour of the viewing angle control structure 190 has a non-right-angled corner C190. The corner C190 is shown as an arced corner in FIG. 3, but may be a chamfered corner in other embodiments. When the design of FIG. 3 is applied to the electronic device 100 of FIG. 1, it can be understood that at least one of the first substrate 122A and the second substrate 122B of the first viewing angle unit 120 has an arced corner or a chamfered corner in the top view direction. Similarly, when the design of FIG. 3 is applied to the electronic device 100A of FIG. 2, it can be understood that at least one of the first substrate 122A and the second substrate 122B of the first viewing angle unit 120 in the viewing angle control structure 190 has an arced corner or a chamfered corner in the top view, and/or at least one of the first substrate 162A and the second substrate 162B of the second viewing angle unit 160 has an arced corner or a chamfered corner in the top view. Through the design of the substrate having the arced corner or the chamfered corner, cracking or separation during collision can be reduced.

The viewing angle control structure 190 may have a first portion 190A and a second portion 190B, and the second portion 190B may be a protruding portion protruding from the first portion 190A, that is, the first portion 190A and the second portion 190B may be integrated. When the design of FIG. 3 is applied to the electronic device 100 of FIG. 1, it can be understood that the second portion 190B may be bent to extend from the first side 110A to the second side 110B of the light emitting unit 110 to be bonded to the circuit control unit 130 similar to the second portion 120B.

FIG. 4 to FIG. 7 are respectively schematic cross-sectional views of the viewing angle control structure of FIG. 3 along a line II-II, a line III-III, a line IV-IV, and a line VV. Referring to FIG. 3 and FIG. 4 to FIG. 6, the viewing angle control structure 190 may include the first viewing angle control unit 120, the second viewing angle control unit 160, the first adhesive layer 170, the second polarizing unit 180B, the third polarizing unit 180C, and the fourth polarizing unit 180D. In the present embodiment and the above embodiments, the same reference numerals are adopted to represent the same elements, and the description of the individual elements in the embodiments may be cross-referenced and applied. In the embodiment, the stacking relationship of the first viewing angle control unit 120, the second viewing angle control unit 160, the first adhesive layer 170, the second polarizing unit 180B, the third polarizing unit 180C, and the fourth polarizing unit 180D may be substantially the same as the stacking relationship of the individual elements shown in FIG. 2.

The first viewing angle control unit 120 includes the first substrate 122A, the second substrate 122B, the sealing member 124A, a sealing member 124B, a sealing member 124C, the switchable medium 126, the first electrode 128A, the second electrode 128B, a third electrode 128C, a fourth electrode 128D, and a fifth electrode 128E. Similar to the above embodiments, the switchable medium 126 is disposed between the first substrate 122A and the second substrate 122B, and the sealing member 124A surrounds the switchable medium 126. The first electrode 128A is disposed between the switchable medium 126 and the first substrate 122A, and the second electrode 128B is disposed between the switchable medium 126 and the second substrate 122B.

Figure 7:
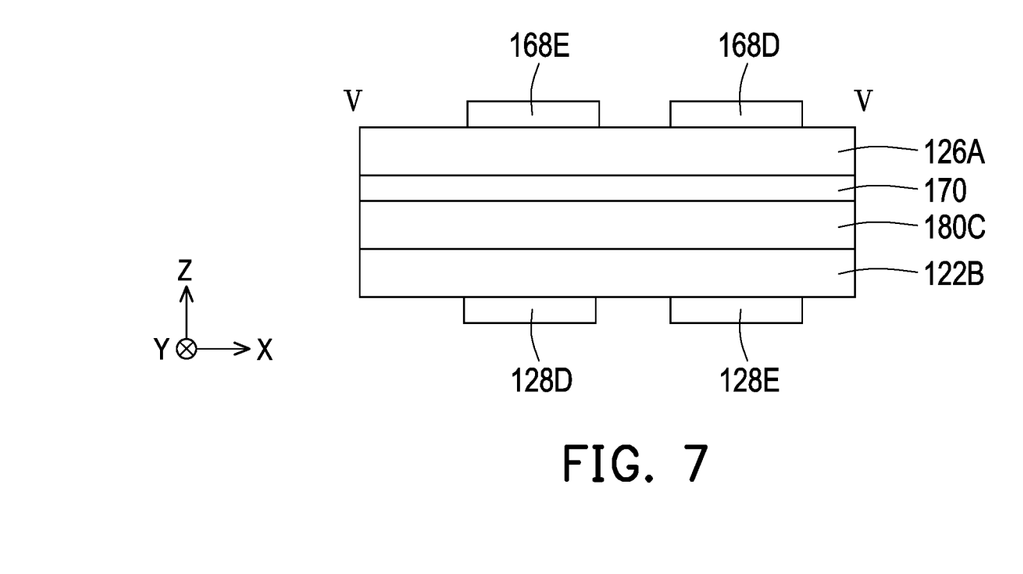

In the embodiment, the viewing angle control structure 190 may be divided into the first portion 190A surrounded by the sealing member 124A and the second portion 190B extending outward from the sealing member 124A according to the arrangement of the sealing member 124A. The first portion 190A may provide the viewing angle control function, and the second portion 190B may be located on the periphery of the first portion 190A. In addition, the length of the second substrate 122B extending outward from the first portion 190A is longer than the first substrate 122A, so that a portion of the second substrate 122B extends beyond the first substrate 122A, thereby defining a bonding part 190C. For example, the second substrate 122B may extend along the direction of the Y-axis. The sealing member 124B is disposed on the edge of the first substrate 122A, the sealing member 124C covers the third electrode 128C, and the sealing member 124A and the sealing member 124B are disposed at two opposite sides of the third electrode 128C. The third electrode 128C, the fourth electrode 128D, the fifth electrode 128E, the sealing member 124B, and the sealing member 124C may be disposed on the second portion 190B, and the fourth electrode 128D and the fifth electrode 128E extend beyond the sealing member 124B and are exposed at the bonding part 190C, as shown in FIG. 4 and FIG. 7.

Figure 4:
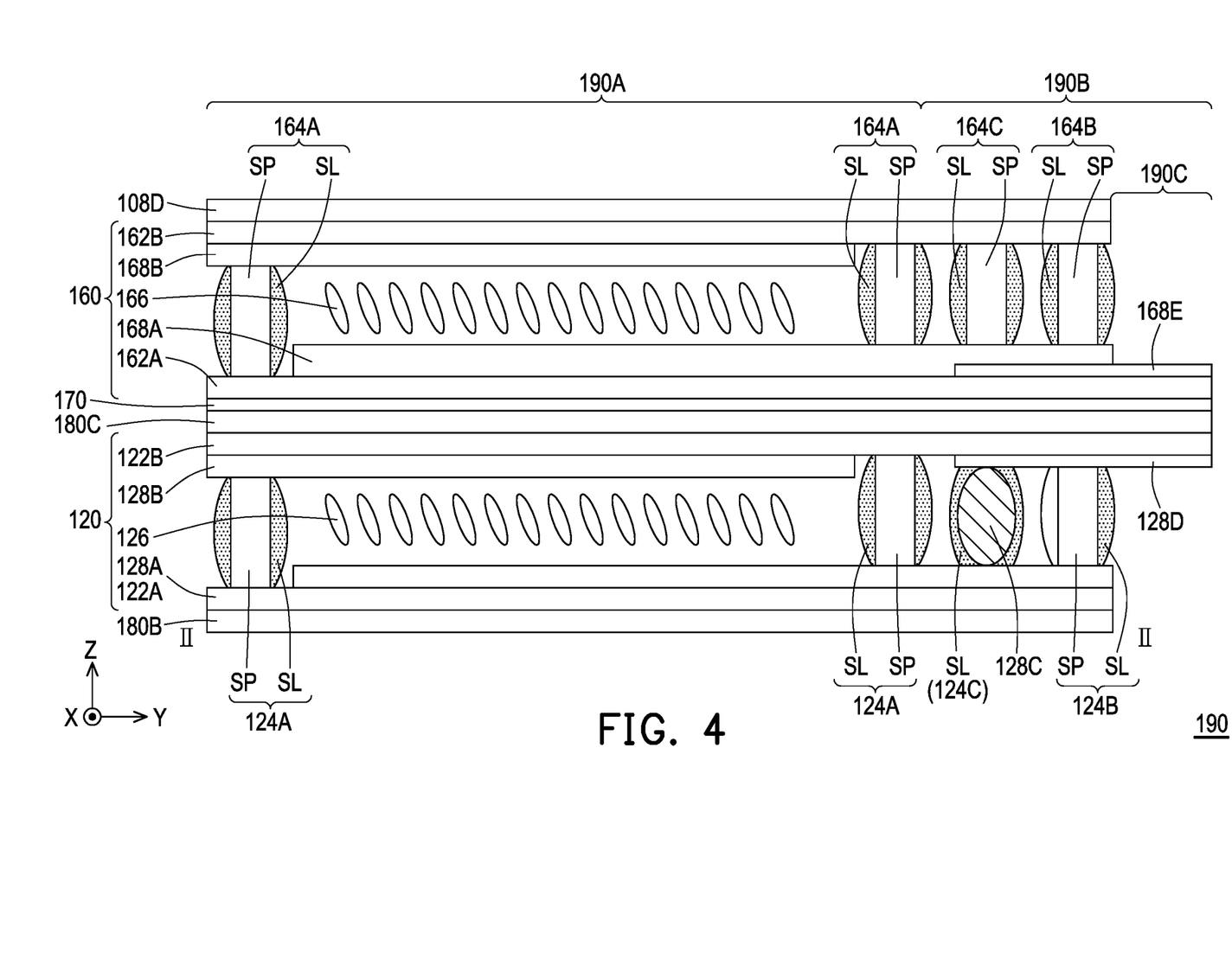
FIG. 4 to FIG. 7 are respectively schematic cross-sectional views of the viewing angle control structure of FIG. 3 along a line II-II a line III-III, a line IV-IV, and a line VV.
Figure 5:
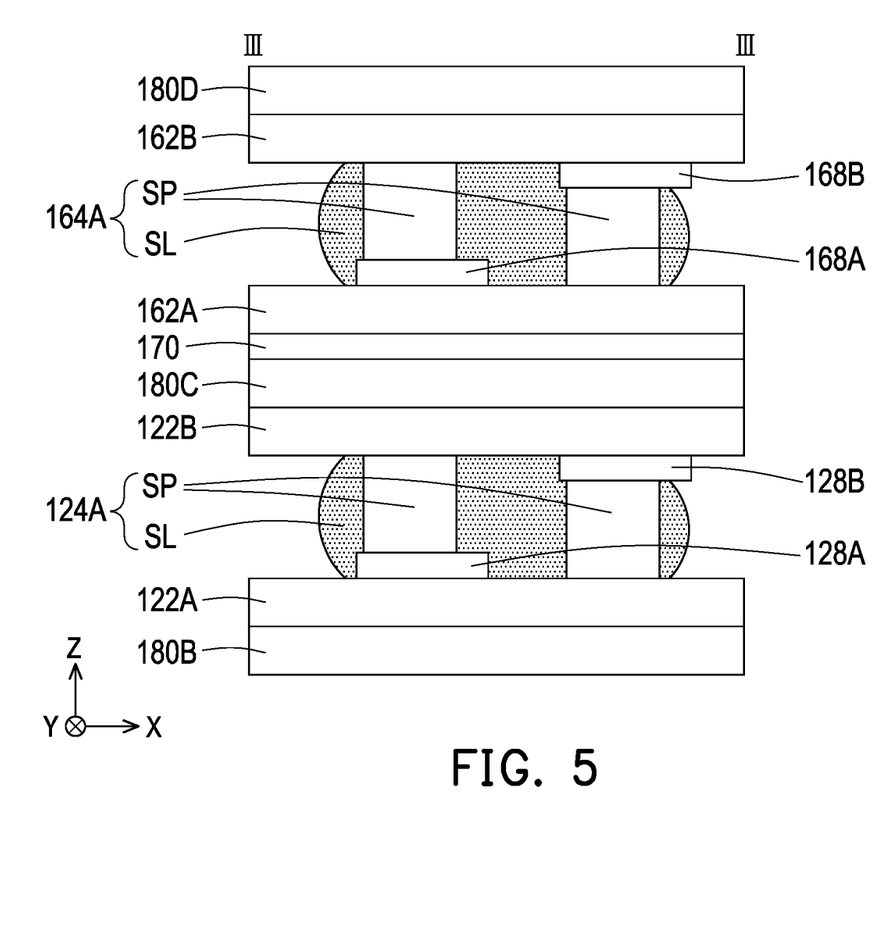
Figure 6:
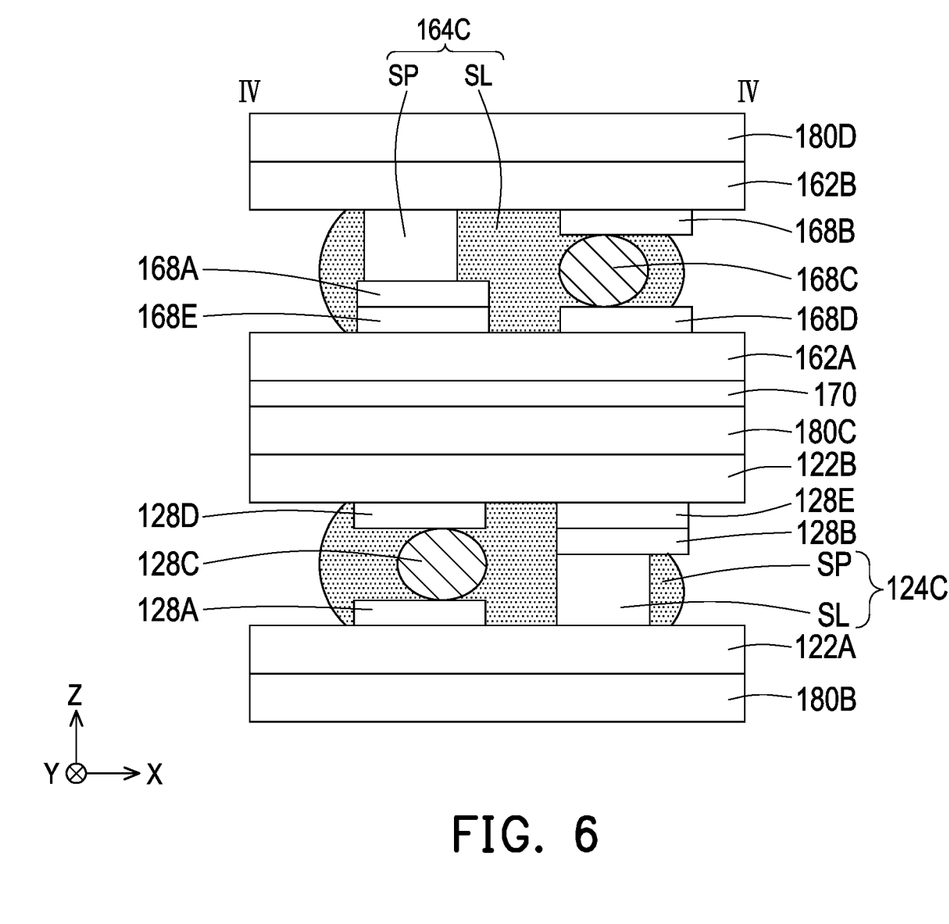

In FIG. 4 and FIG. 6, the third electrode 128C is disposed between the first electrode 128A and the second electrode 128B. The third electrode 128C is, for example, a conductive ball or a conductive adhesive to provide a conductive path between the first substrate 122A and the second substrate 122B. In FIG. 4, FIG. 6, and FIG. 7, the fourth electrode 128D is disposed on the second substrate 122B, and the third electrode 128C may be connected between the first electrode 128A and the fourth electrode 128D. In FIG. 6 and FIG. 7, the fifth electrode 128E is disposed on the second substrate 122B, and the second electrode 128B overlaps with and is connected to the fifth electrode 128E. The fourth electrode 128D and the fifth electrode 128E may be conductive pads, such as metal pads. Similar to the above embodiments, when the first viewing angle control unit 120 is applied to the electronic device 120 of FIG. 1, the second portion 190B may extend from the first side 110A to the second side 110B of the light emitting unit 110 by being bent to be bonded to the circuit control unit 130 located at the second side 110B of the light emitting unit 110. Specifically, the bonding part 190C formed by the second substrate 122B extending beyond the first substrate 122A may be bonded to the circuit control unit 130. In FIG. 4, FIG. 6, and FIG. 7, the fourth electrode 128D and the fifth electrode 128E disposed on the bonding part 190C may be bonded to the circuit control unit 130. In this way, the first electrode 128A may be electrically connected to the fourth electrode 128D on the second substrate 122B through the third electrode 128C and may be electrically connected to the circuit control unit 130 through the fourth electrode 128D. At the same time, in FIG. 5 to FIG. 7, the second electrode 128B on the second substrate 122B may continuously extend outward from the first portion 190A to be connected to the fifth electrode 128E located on the bonding part 190C, so as to be electrically connected to the circuit control unit 130 through the fifth electrode 128E. In this way, the first electrode 128A and the second electrode 128B may both be electrically connected to the circuit control unit 130.

In the embodiment, the sealing member 124A may include a sealing material SL and a supporting material SP. The sealing material SL may include a sealant or a similar adhesive. The supporting material SP may include a fibrous material, a particulate material, etc. The supporting material SP may have a fibrous shape, a spherical shape, a columnar shape, or other shapes. The supporting material SP has sufficient mechanical properties to maintain a separation distance between the first substrate 122A and the second substrate 122B. When the sealing material SL is applied to the viewing angle control structure 190 of FIG. 3, the sealing material SL may be disposed on the periphery of the first portion 190A in the top view and encloses to form an annular pattern. The supporting material SP may be dispersed in the sealing material SL. The sealing member 124B may further include the sealing material SL and the supporting material SP dispersed in the sealing material SL. The sealing member 124B may be disposed corresponding to the third electrode 128C. The sealing member 124C may further include the sealing material SL and the supporting material SP (as shown in FIG. 6), and the sealing material SL of the sealing member 124C may surround the third electrode 128C.

The second viewing angle control unit 160 includes the first substrate 162A, the second substrate 162B, the sealing member 164A, a sealing member 164B, a sealing member 164C, the switchable medium 166, the first electrode 168A, the second electrode 168B, a third electrode 168C, a fourth electrode 168D, and a fifth electrode 168E. The structural design of the second viewing angle control unit 160 is similar to the structural design of the first viewing angle control structure 120, but a portion corresponding to the bonding part 190C in the second viewing angle control unit 160 is the first substrate 162A, and the fourth electrode 168D and the fifth electrode 168E are disposed on the first substrate 162A. The sealing member 164A, the sealing member 164B, and the sealing member 164C are all disposed between the first substrate 162A and the second substrate 162B, and each of the sealing member 164A, the sealing member 164B, and the sealing member 164C may include the sealing material SL and the supporting material SP. The distribution of the sealing member 164A may form an annular pattern to surround the switchable medium 166 in the top view (FIG. 3). The sealing member 164B is disposed on the edge of the second substrate 162B. The sealing member 164C covers the third electrode 168C (as shown in FIG. 6) and is disposed between the sealing member 164A and the sealing member 164B. The first portion 190A of the viewing angle control structure 190 may include a portion surrounded by the sealing member 164A, and the second portion 190B of the viewing angle control structure 190 may include a portion of the second viewing angle control unit 160 extending outward from the sealing member 164A. In addition, the first substrate 162A of the second viewing angle control unit 160 extends beyond the second substrate 162B, and a portion of the first substrate 162A extending further beyond the sealing member 164B may define the bonding part 190C.

In the embodiment, the first adhesive layer 170 may continuously extend on the first portion 190A and the second portion 190B to attach the second substrate 122B of the first viewing angle control unit 120 and the first substrate 162A of the second viewing angle control unit 160 together. The third polarizing unit 180C may continuously extend on the first portion 190A and the second portion 190B, but not limited thereto. The first adhesive layer 170 and the third polarizing unit 180C may be bent following the first viewing angle control unit 120 and the second viewing angle control unit 160. In this way, when the viewing angle control structure 190 is applied to the electronic device 100 of FIG. 1, the first adhesive layer 170 and the third polarizing unit 180C may extend from the first side 110A of the light emitting unit 110 to the second side 110B of the light emitting unit 110 similar to the second portion 120B.

In the second viewing angle control unit 160, the third electrode 168C is disposed between the first electrode 168A and the second electrode 168B, is also located between the first substrate 162A and the second substrate 162B, and may include a material that can provide a conductive path between the first substrate 162A and the second substrate 162B, such as a conductive ball and a conductive adhesive. The fourth electrode 168D and the fifth electrode 168E are disposed on the first substrate 162A. As shown in FIG. 6, the third electrode 168C may be connected between the second electrode 168B and the fourth electrode 168D, and the first electrode 168A may be connected to the fifth electrode 168E. In addition, the fourth electrode 168D and the fifth electrode 168E may be exposed at the bonding part 190C, as shown in FIG. 4 and FIG. 7.

In the viewing angle control structure 190, the first substrate 122A and the second substrate 122B of the first viewing angle control unit 120 and the first substrate 162A and the second substrate 162B of the second viewing angle control unit 160 are all flexible substrates, which have thin thicknesses and flexibility. In some embodiments, the second portion 190B may be bent to not be coplanar with the first portion 190A. Therefore, the second portion 190B may function as a flexible circuit board or a chip on film to implement the electrical connection between the viewing angle control structure 190 and other circuit elements. Therefore, when the viewing angle control structure 190 is applied to the electronic device 100 of FIG. 1, no additional circuit board or electrical connection element is required to implement the electrical connection between the first viewing angle control unit 120 and the second viewing angle control unit 160 and the circuit control unit 130.

Figure 8:
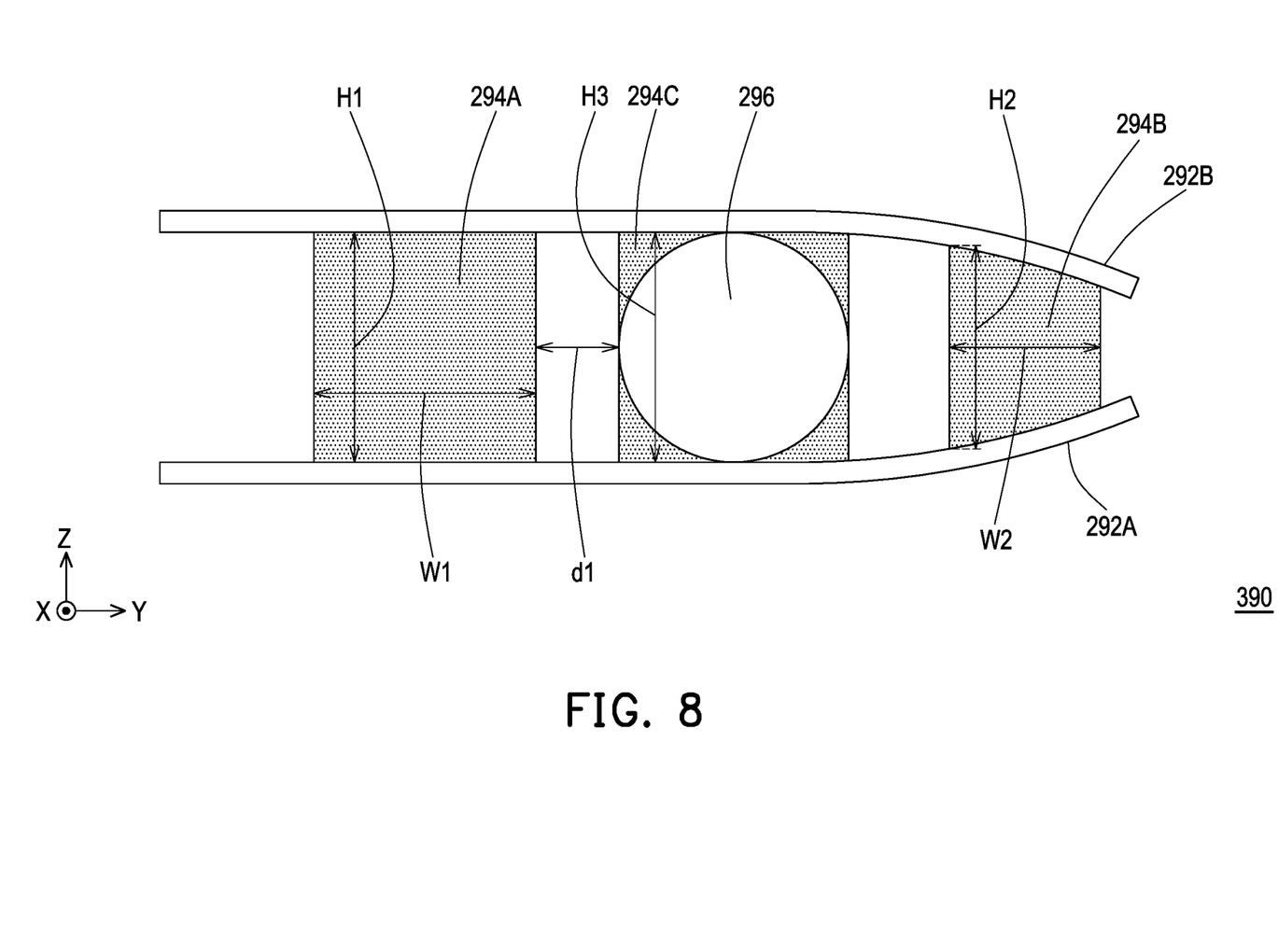
FIG. 8 is a schematic view of some elements in a viewing angle control structure of an electronic device according to an embodiment of the disclosure.

FIG. 8 is a schematic view of some elements in a viewing angle control structure of an electronic device according to an embodiment. For convenience of description, FIG. 8 mainly presents a first substrate 292A, a second substrate 292B, a sealing member 294A, a sealing member 294B, a sealing member 294C, and an electrode 296 of a viewing angle control structure 290, and other components are omitted. The first substrate 292A, the second substrate 292B, the sealing member 294A, the sealing member 294B, the sealing member 294C, and the electrode 296 may respectively correspond to the first substrate 122A, the second substrate 122B, the sealing member 124A, the sealing member 124B, the sealing member 124C, and the third electrode 128 of the first viewing angle control unit 129. Alternatively, the first substrate 292A, the second substrate 292B, the sealing member 294A, the sealing member 294B, the sealing member 294C, and the electrode 296 may respectively correspond to the first substrate 162A, the second substrate 162B, the sealing member 164A, the sealing member 164B, the sealing member 164C, and the third electrode 168. Therefore, FIG. 8 is used to illustrate the arrangement relationship of the two substrates, the sealing members, and the third electrode in the above embodiments, but the disclosure is not limited thereto.

In FIG. 8, the viewing angle control structure 290 includes multiple sealing members, that is, the sealing member 294A, the sealing member 294B, and the sealing member 294C. The sealing member 294B is closer to the edge of the first substrate 292A and the edge of the second substrate 292B than the sealing member 294A and the sealing member 294C. The electrode 296 provides an electrical transmission path between the first substrate 292A and the second substrate 292B. The sealing member 294C may cover the electrode 296 and is disposed between the sealing member 294A and the sealing member 294B. In the top view direction, that is, the Z-axis direction, the heights of the sealing member 294A, the sealing member 294B, and the sealing member 294C may be different. For example, in the top view direction, that is, the Z-axis direction, the sealing member 294A has a height H1, the sealing member 294B has a height H2, and the height H1 may be greater than or equal to the height H2. In some embodiments, the sealing member 294C has a height H3, and the height H3 may be related to the size of the electrode 296, but not limited thereto. In some embodiments, the height H3 may be between the height H1 and the height H2. The height H1 of the sealing member 294A is greater than the height H2 of the sealing member 294B close to the edge of the substrate. As such, the first substrate 292A and the second substrate 292B are not easily separated from the electrode 296, which helps to ensure that the electrode 296 provides electrical transmission between the first substrate 292A and the second substrate 292B. For example, when the first substrate 292A and the second substrate 292B are flexed, due to the arrangement of the sealing member 294B, the first substrate 292A and the second substrate 292B are not easily bent away from each other, which can prevent any one of the first substrate 292A and the second substrate 292B from being peeled off the electrode 296. Therefore, the sealing member 294B helps stabilize the attachment between the electrode 296 and the substrate. In the disclosure, the height of an individual sealing member may be the maximum size of the sealing member measured in the Z-axis direction (or along the thickness direction of the substrate).

In a direction perpendicular to the top view direction, such as the direction of the Y-axis in FIG. 8, the widths of the sealing members 294A, 294B, and 294C may be different. For example, in the direction of the Y-axis, the sealing member 294A has a width W1, the sealing member 294B has a width W2, and the width W1 is greater than the width W2. In addition, the sealing member 294A and the sealing member 294C may be separated by a distance d1, and the sealing member 294B and the sealing member 294C may be separated by a distance d2. In some embodiments, the distance d1 and the distance d2 may be between 0 μm and 1500 μm. In some embodiments, during the assembly process of the first substrate 292A and the second substrate 292B, the sealing member 294A, the sealing member 294B, and the sealing member 294C may be first disposed between the first substrate 292A and the second substrate 292B, and pressure is applied, so that the sealing member 294A, the sealing member 294B, and the sealing member 294C are attached to the first substrate 292A and the second substrate 292B. During such a manufacturing process, the sealing member 294A, the sealing member 294B, and the sealing member 294C may be deformed under pressure. In the embodiment, the arrangement of the distance d1 and the distance d2 may provide a space where the sealing member 294A, the sealing member 294B, and the sealing member 294C may be deformed.

Figure 9:
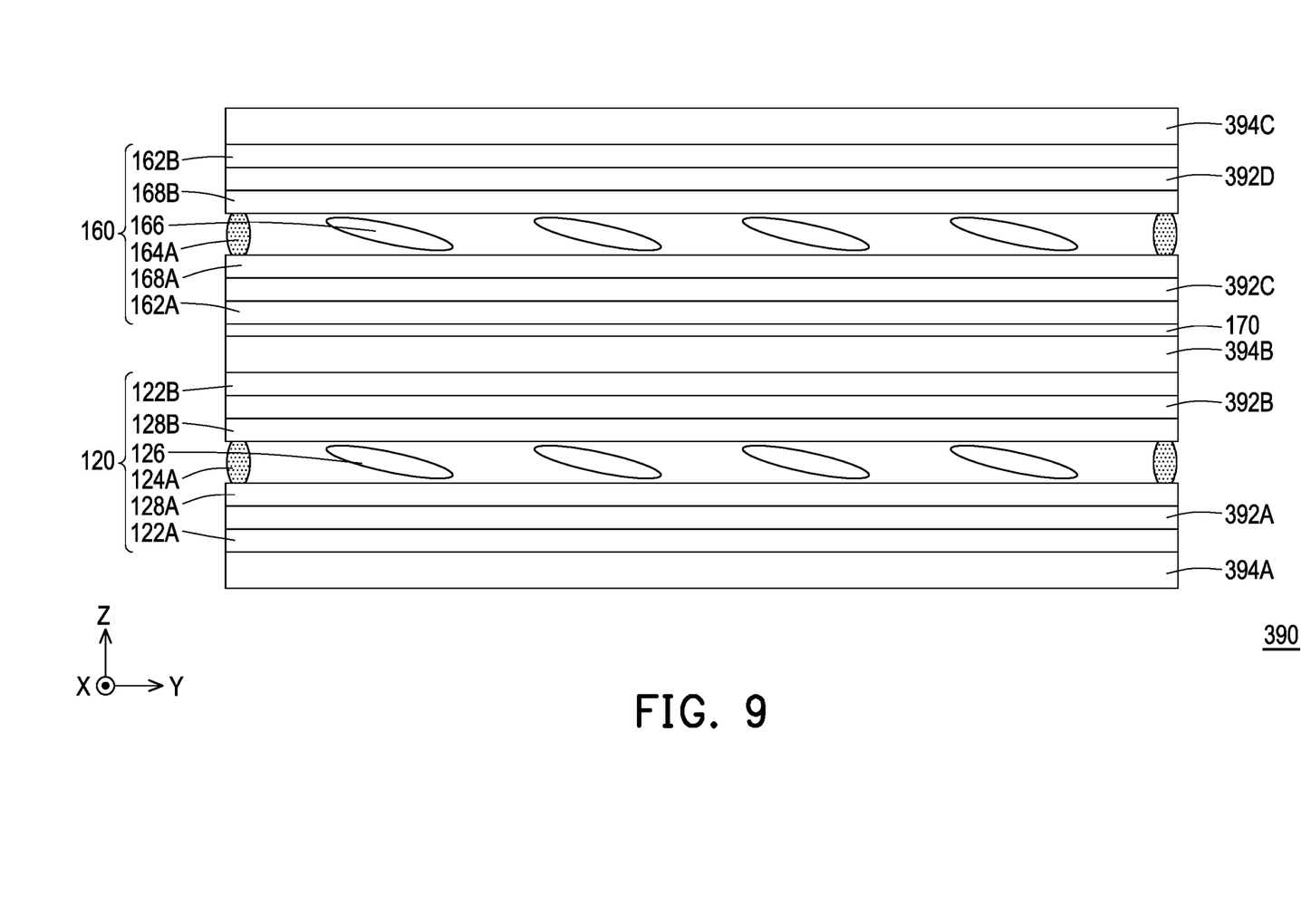
FIG. 9 is a schematic view of a viewing angle control structure according to an embodiment of the disclosure.

FIG. 9 is a schematic view of a viewing angle control structure according to an embodiment of the disclosure. A viewing angle control structure 390 of FIG. 9 may be understood as another implementation of the viewing angle control structure 290 of FIG. 2. Therefore, the same reference numerals in the two embodiments may be understood as referring to the same elements, and the specific description thereof may be cross-referenced and applied. In FIG. 9, the viewing angle control structure 390 includes the first viewing angle control unit 120, the second viewing angle control unit 160, the first adhesive layer 170, a first polarizing unit 392A, a second polarizing unit 392B, a third polarizing unit 392C, a fourth polarizing unit 392D, a supporting plate 394A, a supporting plate 394B, and a supporting plate 394C. For the first viewing angle control unit 120, the second viewing angle control unit 160, and the first adhesive layer 170, reference may be made to the above embodiments. For example, the first viewing angle control unit 120 includes the first substrate 122A, the second substrate 122B, the sealing member 124A, the switchable medium 126, the first electrode 128A, and the second electrode 128B. The second viewing angle control unit 160 includes the first substrate 162A, the second substrate 162B, the sealing member 164A, the switchable medium 166, the first electrode 168A, and the second electrode 168B. The first adhesive layer 170 adheres the second viewing angle control unit 160 to the first viewing angle control unit 120.

In the embodiment, the first polarizing unit 392A and the second polarizing unit 392B may be disposed between the first substrate 122A and the second substrate 122B of the first viewing angle control unit 120 to be integrated with the first viewing angle control unit 120. At the same time, the first viewing angle control unit 120 may be disposed between the supporting plate 394A and the supporting plate 394B. In some embodiments, the first substrate 122A and the second substrate 122B of the first viewing angle control unit 120 may be coating substrates whose materials include coatable polymer materials, such as polyimide, but not limited thereto. In addition, the first polarizing unit 392A and the second polarizing unit 392B may also be coating polarizing layers. The manufacturing manner of the first viewing angle control unit 120 may include the following steps, but not limited thereto. After the material of the first substrate 122A is coated on the supporting plate 394A and cured, the material of the first polarizing unit 392A is coated on the first substrate 122A. After the first polarizing unit 392A is manufactured, the first electrode 128A is formed on the first polarizing unit 392A. In addition, after the material of the second substrate 122B is coated on the supporting plate 394B and cured, the material of the second polarizing unit 392B is coated on the second substrate 122B. After the second polarizing unit 392B is manufactured, the second electrode 128B is formed on the second polarizing unit 392B. Next, the sealing member 124A is disposed between the supporting plate 394A and the supporting plate 394B, so that the first electrode 122A faces the second electrode 122B, and the switchable medium 126 is disposed between the first electrode 122A and the second electrode 122B, and the sealing member 124A surrounds the switchable medium 126. In this way, the first viewing angle control unit 120 with the built-in first polarizing unit 392A and second polarizing unit 392B and disposed between the supporting plate 394A and the supporting plate 394B is completed.

The third polarizing unit 392C and the fourth polarizing unit 392D may also be integrated with the second viewing angle control unit 160 by using a similar manner. In this way, the third polarizing unit 392C may be located between the first substrate 162A and the first electrode 168A of the second viewing angle control unit 160, and the fourth polarizing unit 392D may be located between the second substrate 162B and the second electrode 168B of the second viewing angle control unit 160. In addition, the first substrate 162A of the second viewing angle control unit 160 may be attached to the first adhesive layer 170, and the second substrate 162B of the second viewing angle control unit 160 may be disposed on the supporting plate 394C. In other words, the second viewing angle control unit 160 may be located between the first adhesive layer 170 and the supporting plate 394C.

The viewing angle control structure 390 may be used as an alternative implementation form of the viewing angle control structure 190 and the viewing angle control structure 290 in the above embodiments. The substrate and the polarizing unit in the viewing angle control structure 390 may be manufactured by adopting a coating manner and have thin thicknesses, which helps to reduce the volume of the electronic device. In addition, one of the second polarizing unit 392B and the third polarizing unit 392C in the viewing angle control structure 390 may be omitted to further reduce the overall thickness of the viewing angle control structure 390. The first viewing angle control unit 120 and the second viewing angle control unit 160 may be control switched to provide the privacy protection display mode, and reference may be made to the above embodiments for the related description.

In summary, the electronic device of the embodiments of the disclosure includes the viewing angle control unit, and the viewing angle control unit itself has the bendable extension portion. The viewing angle control unit of the electronic device is directly electrically connected to the circuit control unit by using the bendable extension portion without requiring an additional flexible circuit board. Therefore, the component composition of the electronic device is simplified. In addition, the substrate and the corresponding polarizing unit in the viewing angle control unit may be manufactured by adopting a coating manner and have thin thicknesses, which helps to reduce the volume of the electronic device. The viewing angle control unit adopts flexible substrates, and multiple sealing members are disposed between the substrates, which helps to ensure that the two substrates are not easily peeled off and may maintain the connection between the two substrates, including the connection between the physical substrates and the electrical connection of conductive elements between the substrates.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An electronic device, comprising:
a light emitting unit, having a first side and a second side opposite to the first side;
a first viewing angle control unit, disposed at the first side and the first viewing angle control unit comprises:
a first substrate;
a second substrate, disposed on the first substrate; and
a plurality of sealing members, disposed between the first substrate and the second substrate, wherein heights of the sealing members are different;
a circuit control unit, disposed at the second side, wherein the light emitting unit and the first viewing angle control unit are electrically connected to the circuit control unit;

a second viewing angle control unit, disposed on the first viewing angle control unit; and a first adhesive layer, arranged between the second viewing angle control unit and the first viewing angle control unit, wherein the second viewing angle control unit is electrically connected to the circuit control unit, wherein at least one portion of the first viewing angle control unit is bendable towards the second side.

2. The electronic device according to claim 1, wherein the first viewing angle control unit further comprises: a fourth electrode, disposed on the second substrate and bonded to the circuit control unit.

3. An electronic device, comprising:

a light emitting unit, having a first side and a second side opposite to the first side;

a viewing angle control structure, disposed at the first side, wherein the viewing angle control structure comprises a first substrate, a second substrate, and a plurality of sealing members, the sealing members are disposed between the first substrate and the second substrate, and in a top view direction, heights of the sealing members are different; and a circuit control unit, disposed at the second side, wherein the light emitting unit and the first viewing angle control unit are electrically connected to the circuit control unit, wherein the viewing angle control structure comprises a first portion and a second portion, the first portion and the second portion are integrated, and the second portion is bent and bonded to the circuit control unit, wherein the viewing angle control structure comprises a first viewing angle control unit, a second viewing angle control unit, and a first adhesive layer, and the first adhesive layer adheres the second viewing angle control unit to the first viewing angle control unit.

4. The electronic device according to claim 3, wherein the viewing angle control structure further comprises a plurality of polarizing units, and the first viewing angle control unit and the second viewing angle control unit are respectively disposed between the polarizing units.

5. The electronic device according to claim 4, wherein the polarizing units comprise coating polarizing layers.

6. The electronic device according to claim 3, wherein the first adhesive layer continuously extends on the first portion and the second portion.

* * * * *